United States Patent
Watanuki

(10) Patent No.: US 7,028,388 B2
(45) Date of Patent: Apr. 18, 2006

(54) METHOD OF MANUFACTURING MAGNETIC HEAD

(75) Inventor: Motoichi Watanuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/545,429

(22) Filed: Apr. 7, 2000

(65) Prior Publication Data

US 2003/0172521 A1 Sep. 18, 2003

(30) Foreign Application Priority Data

Jun. 18, 1999 (JP) .................. 11-173337

(51) Int. Cl.
*G11B 5/127* (2006.01)
*H04R 31/00* (2006.01)

(52) U.S. Cl. .............. 29/603.01; 29/603.13; 29/603.14; 360/244.1

(58) Field of Classification Search .......... 29/603.12, 29/603.13, 603.14, 603.17, 603.07; 360/235.8, 360/113, 104, 103, 106; 451/5; 216/22, 216/49

See application file for complete search history.

(56) References Cited

U.S. PATENT DOCUMENTS

| 5,321,882 | A | * | 6/1994 | Zarouri et al. ............. 29/603 |
| 5,993,290 | A | * | 11/1999 | Yoshihara et al. ......... 451/28 |
| 6,074,283 | A | * | 6/2000 | Maeda et al. ............. 451/53 |
| 6,332,264 | B1 | * | 12/2001 | Itoh et al. ............. 29/603.12 |
| 6,532,646 | B1 | * | 3/2003 | Watanuki ............ 29/603.12 |

FOREIGN PATENT DOCUMENTS

| JP | 4-201071 | * | 7/1992 |
| JP | 8-90407 | * | 4/1996 |
| JP | 11-16115 | * | 1/1999 |

* cited by examiner

*Primary Examiner*—Minh Trinh
(74) *Attorney, Agent, or Firm*—Greer, Burns, & Crain, Ltd.

(57) ABSTRACT

The method of manufacturing a magnetic head is capable of correctly setting a raw bar, which includes small sliders, on to a supporting jig, machining the raw bars precisely and improving yield of manufacturing sliders. The method comprises the steps of forming a magnetizable layer, on a surface of a substrate whose thickness is greater than a length of said slider; and cutting said wafer into a raw bar after forming the layers.

5 Claims, 4 Drawing Sheets

METHOD OF MANUFACTURING MAGNETIC HEAD

BACKGROUND OF THE INVENTION

The present invention relates to a method of manufacturing a magnetic head for a magnetic disk drive unit.

A conventional magnetic head for a magnetic disk drive unit is manufactured by the steps of: forming a plurality of layers including a magnetizable layer on a substrate, which is a wafer made of a ceramic, e.g., $Al_2O_3TiC$; cutting the wafer to form a plurality of raw bars; lapping the raw bars; forming air bearing surface patterns on ABS faces of the raw bars; and cutting the raw bars to form sliders.

A thickness of the conventional wafer is equal to or slightly greater than a length of the slider. Note that, the length of the slider is indicated by a symbol "L" in FIG. 8. If the thickness of the wafer is greater than the length of the slider, a rear face of the wafer is abraded to make the thickness of the wafer equal to the length of the slider, then the wafer is cut to form the raw bars. Note that, in the following description, a width of the raw bar means the length of the slider.

These days, recording density of magnetic disks have been higher, so that sizes of sliders of magnetic heads must be small. Sizes of the conventional sliders, e.g., a nano-slider, a pico-slider, a femto-slider, are shown in TABLE.

TABLE

| Slider | Length L (mm) | Thickness D (mm) | Length of Raw Bar (mm) |
|---|---|---|---|
| nano-slider | about 2.05 | 0.40 | 40–50 |
| pico-slider | about 1.25 | 0.30 | 40–50 |
| femto-slider | about 0.85 | 0.23–0.35 | 40–50 |

As shown in TABLE, the length of the smallest sliders is less than 1 mm, and the thickness thereof is 0.2–0.3 mm. A plurality of sliders are formed in each raw bar, which is formed by cutting the wafer, and the length of the raw bar is considerably long with respect to the width and the thickness thereof. Since the raw bars are long and thin, rigidity and machining accuracy of the raw bars must be lower.

When the raw bars are machined, the raw bars are adhered onto a supporting jig. If the rigidity of the raw bars are low, the raw bars are bent and curved by remaining stress, which is caused in a step of forming the layers, so that the machining accuracy must be lower.

By the deformation of the raw bars, the raw bar cannot be correctly set in the supporting jig, so that treatment of the ABS faces, e.g., photolithography, cannot be executed precisely. Since the raw bars are small, it is difficult to clean the raw bars and set them onto the supporting jig correctly, so that edges of the raw bars are apt to be damaged and yield of manufacturing the sliders must be lower, further it takes a long time to correctly set the raw bars onto the jig.

SUMMARY OF THE INVENTION

An object of the present invention is to provide a method of manufacturing a magnetic head, which is capable of correctly setting a raw bar or raw bars, each of which includes small sliders, onto a supporting jig, machining the raw bars precisely and improving yield of manufacturing sliders.

Namely, the method of manufacturing a head slider, comprising the steps of forming a magnetizable layer, on a surface of a substrate whose thickness is greater than a length of said slider and cutting said wafer into a raw bar after forming the layers. Since the thickness of the wafer is thick enough, deformation of the wafer can be prevented and machining accuracy can be improved.

In the method, the raw bar, whose thickness is greater than a length of the slider, may be supported by a supporting jig in the machining step. With this structure, deformation of the raw bar can be prevented and accuracy of machining the raw bar can be improved.

In the method, dummy sections of a plurality of the raw bars may be arranged on one side in the supporting jig, and air bearing surface patterns may by formed on ABS faces of the raw bars by photolithography. By the dummy sections, the photolithography can be executed precisely.

The method may further comprise the steps of: removing the dummy section from the raw bar after forming the air bearing surface patterns on the ABS face; and cutting the raw bar so as to form the slider.

Another method of the present invention comprises the steps of: forming a plurality of layers including a magnetizable layer on a surface of a substrate; cutting the substrate so as to form a plurality of raw bars; and removing a prescribed part of each raw bar, from one end face, in a direction of piling the layers.

The method of the present invention is capable of highly precisely manufactured magnetic heads including small-sized sliders, e.g., femto-sliders. With the higher machining accuracy, reliability of the magnetic heads and the manufacturing yield can be improved.

BRIEF DESCRIPTION OF THE DRAWINGS

Embodiments of the present invention will now be described by way of examples and with reference to the accompanying drawings, in which.

DETAILED DESCRIPTION OF THE PREFERRED EMBODIMENTS

Preferred embodiments of the present invention will now be described in detail with reference to the accompanying drawings.

Figure 1:
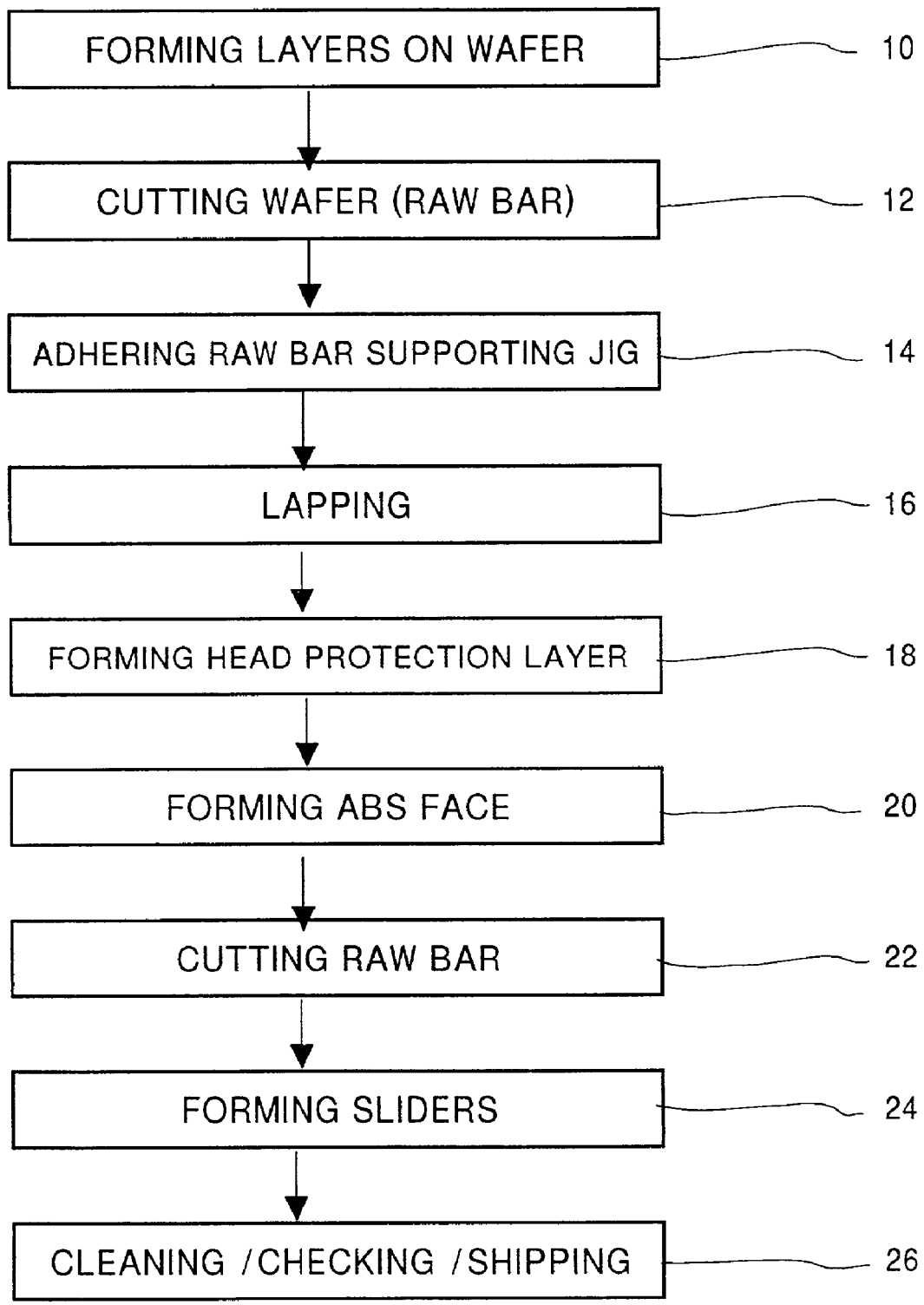
FIG. 1 is a flow chart of the method of manufacturing a magnetic head of an embodiment of the present invention.

FIG. 1 is a flow chart of the method of manufacturing a magnetic head of an embodiment, wherein a plurality of sliders are manufactured from a wafer-shaped substrate. The method will be explained with reference to the flow chart.

In Step 10, thin film layers, which include a magnetizable layer, etc., are formed on a surface of the wafer, which is made of a ceramic, e.g., $Al_2O_3TiC$, so that magnetic head elements are formed on the wafer.

In the present invention, the thickness of the wafer for manufacturing magnetic heads is thicker or greater than a length "L" of the slider. In the conventional method, the thickness of the wafer is made equal to the length of the slider, the film layers are formed on the wafer so as to make the magnetic head elements thereon, then raw bars are made by cutting the wafer. Since the thickness of the wafer is equal to the length of the slider, a width of each raw bar can be equal to the length of the slider.

In the present invention, in the case of manufacturing femto-sliders whose length are considerably short, they are made from the wafer whose thickness is greater than their length. By using the thick wafer, the wafer can have enough rigidity, so that the wafer can properly handled while forming the layers, and high accuracy patterning can be executed.

In a step of cutting the wafer (Step 12) shown in FIG. 1, the raw bars are made by cutting the wafer on which the film layers have been formed.

Figure 2:
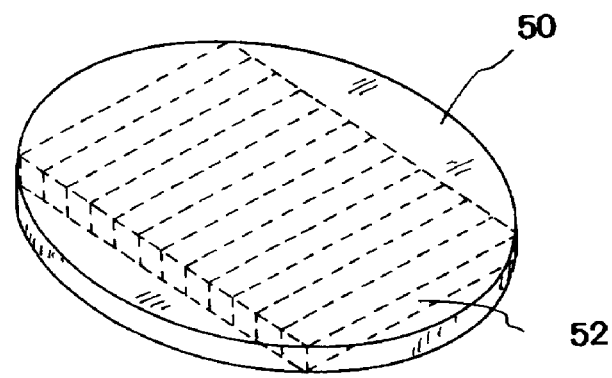
FIG. 2 is an explanation view explaining a method of forming raw bars from a wafer.

In FIG. 2, the raw bars 52 are made by cutting the wafer 50. The wafer 50 are cut, by slicing means, with separations "D", which are equal to thickness of the sliders (see FIG. 3), so as to make the raw bars 52.

Figure 3:
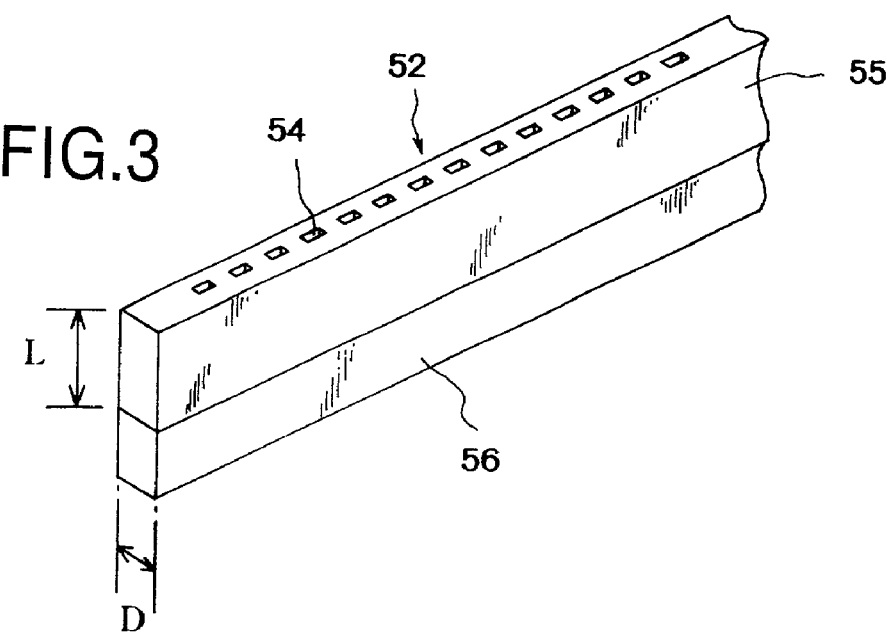
FIG. 3 is an enlarged partial view of the raw bar.
Figure 8:
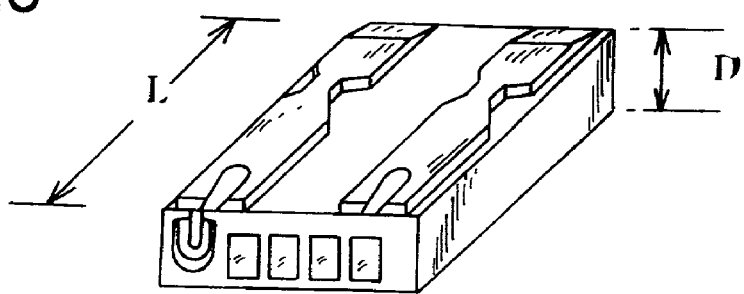
FIG. 8 is a perspective view of sliders.

An enlarged partial perspective view of the raw bar 52, which has been made by cutting the wafer 50, is shown in FIG. 3. The direction of the thickness of the wafer 50 is a longitudinal direction of the slider. A plurality of magnetic head elements 54 are linearly arranged in one end face of the raw bar 52.

The wafer 50 is cut, without abrading its rear face, after forming the film layers so as to make the raw bars 52.

In FIG. 3, a dummy section 56 is formed on the other end of the raw bar 52. Since the thickness of the wafer 50 is greater than the length "L" of the slider, the width of the raw bar 52 is longer than the length "L" of the slider, so that a spare part is formed as the dummy section 56. A slider section 55 will be cut in a following step so as to make the sliders.

For example, in the case of manufacturing the femto-sliders, the thickness of the wafer 50 is 2.5 mm or 1.25 mm, which is equal to the thickness of the conventional wafers, and the raw bars 52 are made by cutting the wafer, even if the length "L" of the sliders are 0.85 mm. In this case, the length "L" shown in FIG. 3 is 0.85 mm, and the rest is the thickness of the dummy section 56.

By using the wafer 50 whose thickness is greater than the length "L" of the sliders, the raw bars 52 can have enough rigidity and deformation of the raw bars 52 can be prevented.

Since the raw bars 52 have enough rigidity, the deformation of the raw bars 52, which are caused by remaining stress applied while forming the film layers, can be effectively prevented. Especially, the deformation of the raw bars 52 cannot be ignored in the case of manufacturing small sliders, e.g., femto-sliders.

Concrete examples of forming the raw bars from the wafer will be explained.

In a first example, the film layers are formed on a surface of a ceramic wafer substrate whose thickness is 2 mm, then the wafer is cut or sliced to form the raw bars 52. By forming the film layers, the total thickness of the wafer is about 2.05 mm. Thus, the width of the raw bars 52 are 2.05 mm.

In a second example, the film layers are formed on a surface of a ceramic wafer substrate whose thickness is 2 mm, and a rear face of the wafer is abraded until reaching the thickness of 1.25 mm, then the wafer is cut or sliced to form the raw bars 52. In this example, the width of the raw bars 52 are 1.25 mm.

In a third example, the film layers are formed on a surface of a ceramic wafer substrate whose thickness is 1.2 mm, then the wafer is cut or sliced to form the raw bars 52. By forming the film layers, the total thickness of the wafer is about 1.25 mm. Thus, the width of the raw bars 52 are 1.25 mm.

In the first to the third examples, the raw bars 52 are made by cutting the wafer whose total thickness is 2.05 mm or 1.25 mm. Conventionally, the thickness of the ceramic wafer substrates for magnetic heads are 2 mm and 1.2 mm. The conventional nano-sliders and pico-sliders are cut from these wafer substrates, and they have predetermined reliability and manufacturing accuracy. The first to the third examples are executed under the same conditions.

In the method of manufacturing magnetic heads of the present invention, the chracteristic point is the width of the raw bars 52, which are longer than the required length of the sliders so as to prevent the deformation of the raw bars 52 while manufacturing them. Therefore, the width of the raw bars or the thickness of the wafer 50 is not limited to above described examples. But the raw bars 52, which are made by cutting the wafer 50, should have enough rigidity so as to prevent the deformation of the raw bars 52.

The raw bars 52 cut from the wafer 50 are adhered onto a supporting jig, by an adhesive agent, e.g., wax, for following manufacturing steps, e.g., a lapping step (Step 14). With high rigidity of the raw bars 52, the raw bars 52 are not deformed when they are adhered onto the supporting jig and they can be positioned thereon with high positioning accuracy.

Next, ELG lapping or crown lapping is executed to the raw bars 52, which have been adhered on the supporting jig (Step 16). Since the raw bars 52 are precisely adhered on the supporting jig, their MR height can be precisely adjusted by lapping, so that magnetic heads, whose characteristics are not varied, can be produced. Further, lapping, e.g., crown lapping, twist lapping, can be executed with high lapping accuracy.

Successively, the raw bars 52 are arranged onto a flat jig, and head protecting layers are formed on the raw bars (Step 18), then ABS faces are formed thereon (Step 20). In the step of forming the ABS faces, predetermined air bearing surface patterns are formed on the surfaces of the raw bars 52 by repeating a manner of photolithography: an exposing step, a developing step and an etching step. In the exposing, developing and etching steps, the air bearing surface patterns are highly precisely formed, so the raw bars 52 must be correctly positioned and arranged in the jig.

Figure 6A:
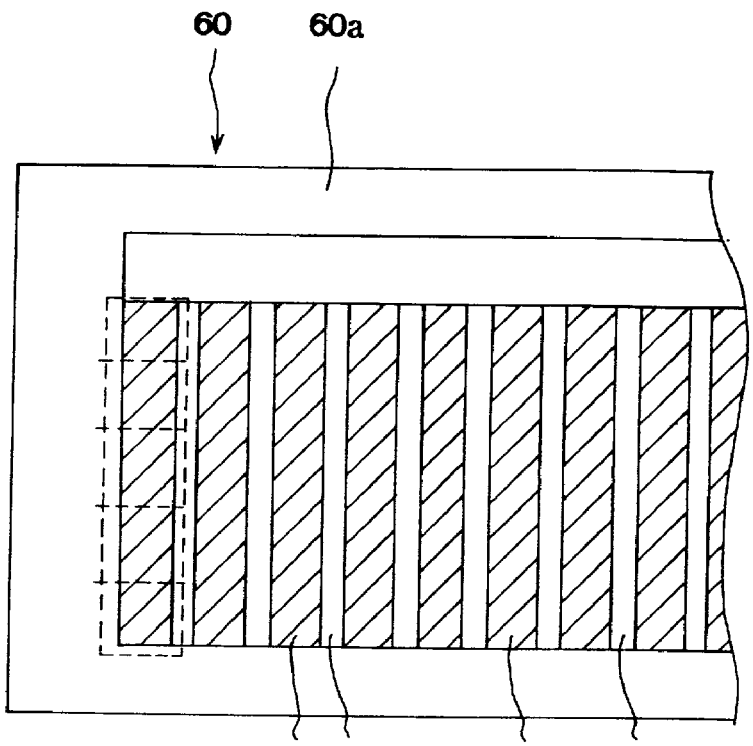
FIG. 6A is a plan view of the raw bars set on a conventional supporting jig.
Figure 6B:
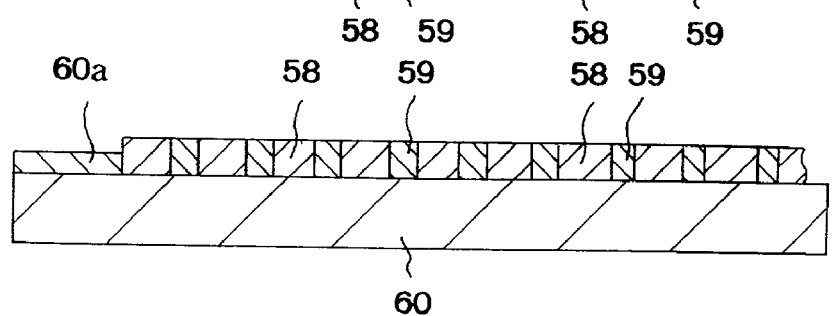
FIG. 6B is a sectional view of the raw bars set on the conventional supporting jig.

A conventional method of mounting raw bars onto a jig will be explained with reference to FIGS. 6A and 6B. FIG. 6A is a plan view; FIG. 6B is a sectional view. To correctly position raw bars 58, the raw bars 58 are arranged along a frame section 60a of a jig 60. Dummy bars 59 are respectively provided between the adjacent raw bars 58 so as to securely expose edge sections of the raw bars 58 and securely form air bearing surface patterns therein. Namely, deformation of the raw bars 58 are prevented and they can be securely exposed by providing the dummy bars 59 between the adjacent raw bars 58 as spacers.

Figure 7:
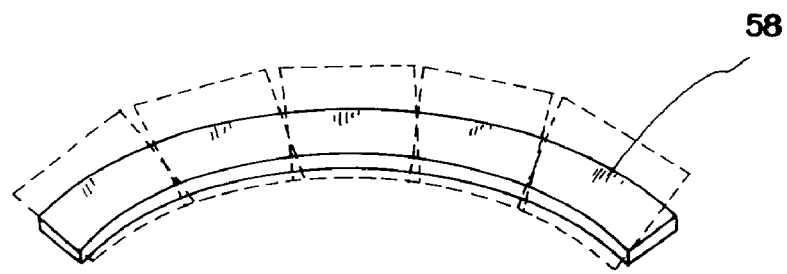
FIG. 7 is a perspective view of the deformed raw bars.

In the case that the raw bars 58 are less deformed, the raw bars 58 may be arranged on the jig 60 with prescribed spaces. However, in the case that the raw bar 58 is considerably curved as shown in FIG. 7, an exposing area must be divided into a plurality of sub-areas, each of which are shown by dotted lines. In the case of the conventional nano-slider, whose raw bar has the width of 2.05 mm, amount of the deformation or curving of the raw bar is 1 µm or less; in the case of the conventional pico-slider, whose raw bar has the width of 1.25 mm, the amount of the deformation or curving of the raw bar is about 4–8 µm. On the other hand, in the case of the femto-slider, whose raw bar has the width of 0.85 mm, the amount of the deformation or curving of the raw bar will be about 12–25 µm. The amount of the deformation of the slider of the femto-slider is ten times as great as that of the nano-slider, so the deformation of the raw bar of the femto-slider must be corrected so as to manufacture the precise femto-slider.

Figure 4A:
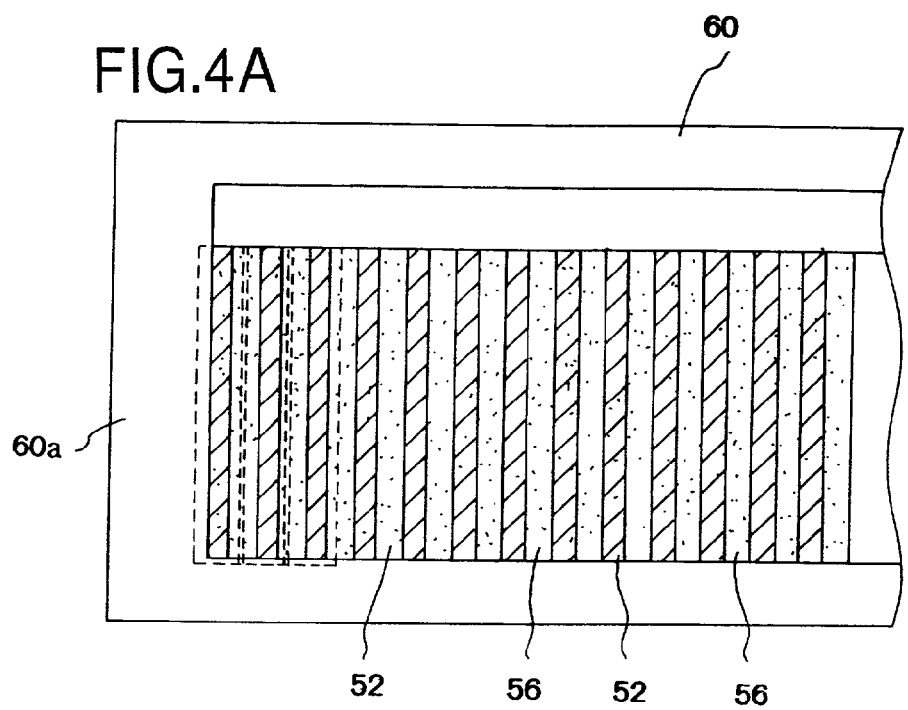
FIG. 4A is a plan view of the raw bars set on a supporting jig.
Figure 4B:
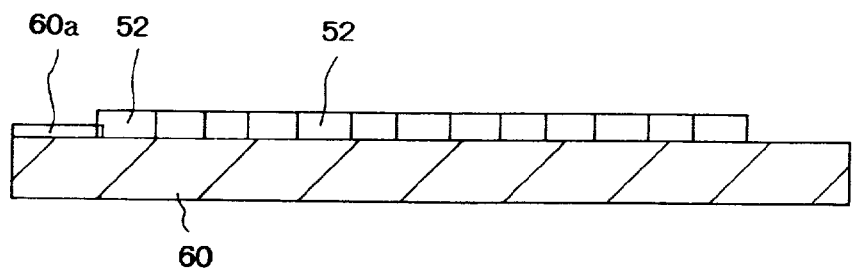
FIG. 4B is a sectional view of the raw bars set on the supporting jig.

The method of mounting the raw bars 52 onto the jig 60 of the present embodiment will be explained with reference to FIGS. 4A and 4B. As described above, the width of the raw bars 52 are greater or longer than the required length of the sliders. Namely, the width of the raw bars 52 are almost equal to that of the raw bars for the nono-sliders or the pico-sliders, so the raw bars 52 have enough rigidity and can be correctly mounted on the jig 60 without deformation. Since each raw bar 52 has the dummy section 56 and each dummy section 56 is arranged on one side, the dummy sections 56 act as spacers. With the spacers, light for exposing one raw bar 52 never interferes the adjacent raw bar 52.

In the method of the present invention, no dummy bars 59 for correctly arranging the raw bars 52 in the jig 60 are required, and the raw bars 52 can be correctly exposed and developed by arranging the raw bars 52 only in the jig 60.

The planar deformation of the raw bars 52 can be considerably restricted, so that the exposing area can be wholly exposed without dividing into a plurality of sub-areas. Therefore, the exposing step for forming the air bearing surface patterns on the ABS faces can be efficiently and precisely executed.

Figure 5:
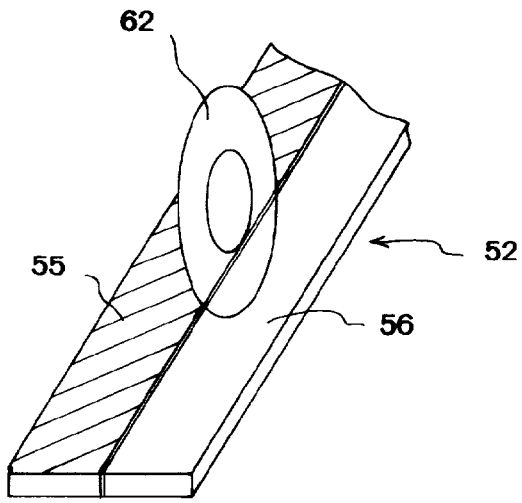
FIG. 5 is an explanation view explaining a method of removing a dummy section from the raw bar.

In the flow chart of FIG. 1, the dummy sections 56 are removed from the raw bars 52, after the air bearing surface patterns are formed in the ABS faces, in a cutting step (Step 22). A method of removing the dummy section 56 from the raw bar 52 is shown in FIG. 5. The raw bar 52 has the slider section 55 and the dummy section 56, so the dummy section 56 is removed from the raw bar 52 by slicing the raw bar 52 along a border line between the slider section 55 and the dummy section 56. The raw bar is sliced by a diamond wheel 62.

After removing the dummy section 56, in a forming step (Step 24), the slider section 55 is cut, in the transverse direction, so as to form a plurality of pieces of the sliders.

In Step 26, the sliders are cleaned, checked and shipped.

As described above, in the method of the present invention, the thickness of the wafer is greater than the length of the slider, so that the deformation of the wafer can be prevented and the film layers can be precisely formed thereon. Further, the width of the raw bar is also wider than the length of the slider, even if the rear face of the wafer is abraded, so that the deformation of the raw bar can be prevented, the raw bar can be precisely machined and the yield of manufacturing the magnetic heads can be improved.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of manufacturing a head slider, comprising the steps of:
    forming a magnetizable layer on a surface of a substrate wafer having a thickness greater than a length of the slider;
    cutting said wafer into a plurality of raw bars after forming said layer while said thickness of said wafer is still greater than said length of the slider;
    supporting said plurality of raw bars by a supporting jig;
    arranging dummy sections of said plurality of raw bars in a single direction;
    forming air bearing surface patterns on air bearing surface faces of said plurality of raw bars by photolithography; and
    removing said dummy sections from said plurality of raw bars after forming said air bearing surface patterns.

2. The method according to claim 1, wherein said plurality of raw bars have thicknesses greater than a length of said slider, and are supported by said supporting jig in a machining step.

3. The method according to claim 1, wherein said dummy sections of said plurality of raw bars are arranged on one side in said supporting jig.

4. The method according to claim 1, further comprising the step of cutting at least one of said plurality of raw bars so as to form the slider.

5. The method according to claim 1, further comprising the step of removing the dummy sections before cutting into at least one of said plurality of raw bars.

* * * * *